(12) United States Patent
Elber et al.

(10) Patent No.: US 7,409,647 B2
(45) Date of Patent: Aug. 5, 2008

(54) CONTROL OF INTERACTIONS WITHIN VIRTUAL ENVIRONMENTS

(75) Inventors: Gershon Elber, Haifa (IL); Orit Shaked, Nofit (IL); Oded Shmueli, Nofit (IL)

(73) Assignee: Technion Research & Development Foundation Ltd., Haifa (IL)

( * ) Notice: Subject to any disclaimer, the term of this patent is extended or adjusted under 35 U.S.C. 154(b) by 533 days.

(21) Appl. No.: 09/887,026

(22) Filed: Jun. 25, 2001

(65) Prior Publication Data

US 2002/0033839 A1    Mar. 21, 2002

Related U.S. Application Data

(60) Provisional application No. 60/233,478, filed on Sep. 19, 2000.

(51) Int. Cl.
*G06F 3/00* (2006.01)
*G06F 9/00* (2006.01)
*G06F 17/00* (2006.01)

(52) U.S. Cl. .................. 715/848; 715/849; 715/850; 715/762

(58) Field of Classification Search ................ 345/762, 345/848, 473
See application file for complete search history.

(56) References Cited

U.S. PATENT DOCUMENTS

| | | | |
|---|---|---|---|
| 5,279,912 A | 1/1994 | Telfer et al. | |
| 5,465,362 A | 11/1995 | Orton et al. | |
| 5,630,757 A * | 5/1997 | Gagin et al. | 463/43 |
| 5,870,136 A | 2/1999 | Fuchs et al. | |
| 5,903,271 A | 5/1999 | Bardon et al. | |
| 5,923,271 A | 7/1999 | Santini | |
| 6,059,506 A | 5/2000 | Kramer | |
| 6,069,632 A | 5/2000 | Mullaly et al. | |
| 6,131,097 A | 10/2000 | Peurach et al. | |
| 6,374,255 B1 | 4/2002 | Peurach et al. | |
| 6,388,667 B1 * | 5/2002 | Sato et al. | 345/473 |
| 6,734,885 B1 * | 5/2004 | Matsuda | 345/848 |

* cited by examiner

*Primary Examiner*—David A. Wiley
*Assistant Examiner*—Boris Pesin

(57) ABSTRACT

A virtual object for use in an object oriented environment; the virtual object comprising at least a user-sensible aspect and further comprising at least a functional aspect; the said user-sensible aspect being encapsulated as a user-sensible encapsulation, separately from the functional aspect, which is encapsulated as a functional encapsulation.

37 Claims, 10 Drawing Sheets

CONTROL OF INTERACTIONS WITHIN VIRTUAL ENVIRONMENTS

RELATIONSHIP TO EXISTING APPLICATIONS

The present application claims priority from U.S. Provisional Patent Application No. 60/233,478 filed Sep. 19, 2000.

FIELD OF THE INVENTION

The present invention relates to methods and apparatus for the control of interactions within virtual environments, and more particularly, but not exclusively to control of interactive relationships of three dimensional (hereinafter 3D) objects in distributed 3D environments.

BACKGROUND OF THE INVENTION

Some applications are graphics based, and may, using what is commonly termed virtual reality, give an illusion of 3D space by situating virtual objects on a virtual 3D grid. Using immersion equipment, users can interact with this virtual environment. Additionally or alternatively, the 3D space can be projected on to a substantially flat or 2D surface such as a computer visual display unit (VDU), so that virtual objects are viewed on substantially 2D computer screens, yet nevertheless, an illusion of solidity is maintained, and such virtual objects have, in addition to height and width, an apparent depth. These objects may move with respect to backgrounds or scenes, which may be substantially stationary, though often may be viewable from different angles, and if the viewing angle is changed, the whole scene is rotated in consequence. Alternatively, as with flight simulators for example, the background may constantly change in a dynamic manner.

As illustrated in FIG. 1, which shows schematically the inter-relationships between clients and server in networked computing environments, networked computing comprises a plurality of remote terminals or clients interacting with the same computer application, the bulk of which usually runs on a host computer known as the server. The clients and the server are interconnected via a network. The individual clients are often at a considerable distance from each other and from the host server.

Now the speed at which a computer application runs is a function of both the complexity of the software, and the capability of the hardware. In networked computing however, particularly with data-intensive, heavy applications, the speed at which applications run is often limited by the time required for necessary data to be transferred between the networked computers. The data transfer time is a function of the bandwidth of the data transfer lines, and of the volume of data that requires transporting. Clearly there is a desire to limit the quantity of data that is transported between the client and the server, and efficient programming and data compression techniques are used to facilitate this data limiting.

The Internet is a multiclient computing environment that potentially allows many users to interact with each other using the same application, enabling a large number of players to play the same adventure game for example. To facilitate multiplayer interaction in a 3D virtual graphic environment, in real-time, it is required that interactions by one user at one client, are transmitted to the server and to other clients fast enough that correct sequencing is maintained, thus preferentially the moves of one player appear instantaneously on the monitors of all other players. Increasing the running efficiency, and, in particular, achieving real-time updating of high-resolution 3D graphical displays to multiple users is a challenging aim.

Apart from games and the like, virtual reality has also been applied to various areas of human endeavor, replacing real world experimentation where, due to economic, safety and other considerations, it has been deemed preferable to use simulations rather than the real thing. Examples of this include anatomical simulations of the human body for pedagogic purposes in the training of doctors and surgeons, object design for manufacturing and virtual prototyping, guidance for installation and trouble-shooting for computer peripherals such as printers, and battle field simulation for training the military, such as flight simulators for training aircraft pilots, tank drivers and artillery personnel.

As computer programs have got more sophisticated, comprising larger quantities of code, structural programming has given way to Object Oriented Programming (OOP). The object oriented programming approach breaks down problems into groups of related parts that take into account both the code and the data related to each group. The groups are then organized into a hierarchical structure and translated into subgroups called objects. Virtual objects are logical entities that encapsulate both data and the code that manipulates that data.

Object oriented programming has been applied with success to virtual reality computer applications. A virtual object in a virtual reality environment can be programmed as a computing object in the sense of object oriented programming, thus the appearance or form of the object, its behavior or function, and its location data may be encapsulated together into a quasi-autonomous entity. Programming in this manner provides a modular construction that facilitates comprehension of complex programs, for updating and the like. It also avoids the problems associated with sharing files between different aspects of a program. In multiple-user, real-time networked applications however; the traditional object oriented programming approach has been found to be somewhat inadequate. By encapsulating the display and interaction characteristics of an object with those characteristics that describe function and behavior, the objects comprise large amounts of data. Transferring such large amounts of data between networked computers requires considerable resources in terms of bandwidth and/or transfer time.

Traditionally, in virtual reality, the placing of objects within a scene is accomplished by constructing the scene in 3D space on a Cartesian grid comprising orthogonal axes, or some other coordinate system appropriate for the specific application. A centroid is then defined for each object within the scene, and the centroid of each object is then plotted onto the coordinate system. When an object is moved, the centroid thereof is repositioned, and the object is redrawn at its new location. In some applications, the whole scene may be redrawn. Thus the positions of objects are defined with respect to the grid, and different objects within close proximity may not be directly aware of each other.

A useful software platform for virtual reality applications is GInlt. This has been disclosed; see Shmueli and Elber, [Shmueli O. and Elber G., Managing Data and Interactions in Three Dimensional Environments. Software for Communication Technologies—$3^{rd}$ Austrian-Technion Symposium, Lintz, Austria, April 1999] which is incorporated herein by reference.

SUMMARY OF THE INVENTION

It is an aim of the present embodiments, to separately store the form and function characteristics of virtual objects, so that user sensible characteristics or the form of the object may be downloaded to user clients, without downloading functional or behavioral characteristics.

It is a further aim of the present embodiments, to control the functional and behavioral aspects of virtual objects with dedicated modular units.

It is a further aim of the present embodiments, to control consequential interactions as will be explained.

It is a further aim of the present embodiments, to provide associations between objects, such that changes in one object automatically trigger desired changes in associated objects.

It is a further aim of the present embodiments, to control, and more particularly to limit, secondary effects of object interactions.

It is a further aim of the present embodiments, to facilitate real time multiple client interaction with objects within the same networked virtual environment.

It is a further aim of the present embodiments, to limit the amount of data requiring transfer between the different nodes of a networked interactive computing environment, to allow interactions with said environment to be transmitted to all clients in real time.

It is a further aim of the present embodiments to encapsulate the functionality of a scene and the objects within it, as a separate, though associated entity from the encapsulation of the display aspects thereof, thus allowing the association of different functionalities with the set of objects comprising an existing scene.

These and other aims of the present embodiments will become clear from the following description.

According to a first aspect of the present invention there is thus provided a virtual object for use in an object oriented environment; said virtual object comprising at least a user-sensible aspect and further comprising at least a functional aspect; the said user-sensible aspect being encapsulated as a usersensible encapsulation, separately from said functional aspect.

Preferably, the object oriented environment is supported on a computer network comprising a first computer linked to a second computer. The user-sensible aspect is supported by said first computer and the functional aspect is supported by said second computer.

Preferably, the functional aspect is a behavioral aspect.

Preferably, the user-sensible aspect is a display aspect.

Preferably the functional aspect is encapsulated, so as to be exchangeable for an alternative functional encapsulation, thereby to alter the functionality of the said object.

The virtual object may be further at least partly defined by a relationship with a second object. The relationship may involve relative positioning or movement of the two objects or it may involve color or sound or any other feature of either of the two objects in the relationship.

According to a second aspect of the present invention there is provided a first virtual object within a virtual computing environment, said first virtual object having a relationship with a second virtual object, said relationship being such that an interaction with said first virtual object is operable to bring about a consequential interaction with at least said second object.

The relationship may be a direct or an indirect relationship, indirect meaning a relationship involving at least one mediating interaction with at least one intermediate object.

Preferably, the relationship with the second virtual object is defined by an order number, said order number being equal to the number of consequentially interacting objects.

A preferred embodiment has a predetermined interaction limit, and an interaction stopper operable to prevent further consequential interactions occurring once a number of interactions corresponding to said interaction limit has been reached.

In preferred embodiments, said predetermined interaction limit is specific to at least one of an interaction order and an interaction type, and said interaction stopper is operable to stop interactions within said specificity. For example the limit may apply to first order interactions only or to first and second order interactions only or to first order interactions between objects on the same side or the like.

In preferred embodiments, said consequential interaction with said at least second object comprises a change in at least one of location, movement, shape, size and color of said second object.

According to a third aspect of the present invention there is provided a virtual reality environment comprising a scene and at least one virtual object supported by a scene database, said scene database having at least a first interchangeable functional unit associated therewith, said first interchangeable functional unit comprises functionality for said at least one first virtual object.

Preferably, said functionality for at least said first virtual object comprises behavioral rules.

Preferably, said functionality for at least said first object comprises rules for determining allowable interactions therewith.

Preferably, said functionality comprises rules for determining non-allowable interactions therewith.

Preferably, said functionality comprises rules for restricting allowable interactions therewith.

Preferably, the first virtual object comprises a user-sensible aspect, the said user-sensible aspect being encapsulated separately from said interchangeable functional unit.

Preferably, the user-sensible aspect comprises data for display of said virtual object.

Preferably, the interchangeable functional unit is interchangeable to alter the functionality of said virtual object.

Preferably, the first interchangeable functional unit comprises object-specific functionality for a plurality of virtual objects.

A preferred embodiment comprises at least one second virtual object, the first virtual object being partly defined by a relationship with said at least one second virtual object.

The relationship may be direct or indirect.

Preferably, the first virtual object comprises a relationship with said at least one second virtual object such that an interaction applied to said first virtual object causes a consequential interaction with said at least one second virtual object.

Alternatively, the relationship with said at least one second object is an indirect relationship, being a relationship involving at least one mediating interaction with at least one intermediate object.

The relationship with said at least one second object may be defined by an order number, said order number being equal to the number of consequentially interacting objects.

A preferred embodiment may have a predetermined interaction total, and an interaction limiter operable to stop further first order consequential interactions occurring when a number of first order interactions equaling said predetermined interaction total has been reached.

In an alternative embodiment the interactions that are limited need not be first order but may be any order or may just be a higher order. Alternatively the interactions may be limited by type rather than order, or a combination of the two may be provided.

In an embodiment, consequential interaction with said at least one second object comprises a change in position of said second object. The interaction could also comprise a change in color of said second object.

According to a third aspect of the present invention there is provided a dedicated control element for controlling the functionality of virtual objects belonging to a set of virtual objects within an environment, said dedicated control element being associated with said environment, and comprising:

recognition functionality for recognizing whether a virtual object within said environment is a member of said set, and control functionality for processing events received from said recognized virtual object.

According to a fourth aspect of the present invention there is provided a method for facilitating interaction by a plurality of users at a plurality of client terminals with at least a first object, said first object having display and interaction characteristics and functional characteristics, in a networked virtual reality environment; said method comprising:

encapsulating the display and interaction characteristics in a display part of said first object, encapsulating functional characteristics in a functional part of said first object, downloading said display part of said first object to user client terminals, and retaining said functional part of said first object at a remote location networked with said user client terminals.

According to a fifth aspect of the present invention there is provided a method for restricting the number of consequential interactions to further virtual objects having a relationship with a first virtual object, said consequential interactions resulting from an interaction with said first virtual object, said method comprising:

defining a maximum number of consequential interactions, counting consequential interactions, and stopping further interaction when said maximum number of consequential interactions is reached.

Preferably, said related further objects have a causative relationship with said first object.

Preferably, a change in a position of said first virtual object causes consequential interactions with said further objects.

Preferably, said relationship is direct.

Alternatively, said relationships with said further objects comprise indirect relationships, being relationships involving at least one mediating interaction with at least one intermediate object.

Preferably, the relationship with each said further object is defined by an order number, said order number being equal to the number of consequently interacting objects.

Preferably, allowable consequential interactions are restricted to a predetermined number of objects having first order relationships therewith.

Preferably, the consequential interaction with said further object comprises a change in position of at least one of said objects.

According to a sixth aspect of the present invention there is provided a method for controlling the functionality of a set of virtual objects within an environment, comprising:

incorporating allowable functionality for said set of virtual objects within a dedicated control element associated with said environment, incorporating recognition functionality within said dedicated control element to enable said dedicated control element to distinguish between virtual objects within said set and virtual objects not within said set, and thereby allowing said dedicated control element to control virtual objects within said set.

According to a further aspect of the present invention there is provided a method for facilitating interaction by a plurality of users at a plurality of client terminals with at least a first object, said first object having display and interaction characteristics and functional characteristics, in a networked virtual reality environment; said method comprising:

encapsulating the display and interaction characteristics in a display and interaction part of said first object, encapsulating functional characteristics in a functional part of said first object, downloading said display and interaction part of said first object to user client terminals, and retaining said functional part of said first object at a remote location networked with said user client terminals, said interactions comprising trading using said objects.

In the following description, the term 'comprise', and variations thereof, such as 'comprising' and 'comprised' imply that the invention includes the elements listed, but is not necessarily restricted to those elements, and may additionally comprise other elements.

In the context of this document, words such as solid, object, scene, environment and the like, refer to virtual solid, virtual object, virtual scene, virtual environment and the like, unless the context clearly implies otherwise.

For brevity, the term 'mouse' refers to any cursor-manipulating device, including but not necessarily restricted to a computer mouse, which is an input device for moving an object, often a cursor, on a computer visual display unit (VDU). The term mouse is used herein, reflecting the widespread usage of the computer mouse for this purpose, however in this context, the term mouse should be understood to also refer to other input devices, such as tracker balls, lightpens, keyboards, cursor arrows or other designated keyboard keys, joysticks, paddles or the object manipulation components of dedicated 3D immersion or virtual reality equipment.

Similarly, the term 'VDU' may refer to any display device, particular 2D computer monitors, such as liquid crystal displays (LCD), cathode ray tubes, image projectors and screen, and to any similar device. Likewise, the visual components of dedicated 3D immersion or virtual reality equipment are to be considered as within the ambience of this term.

Similarly, the term 'computer' is to be understood loosely, to include for example, portable phones and TV sets when equipped for graphical, networked, interaction.

The present invention relates to objects in an object-oriented environment, thus the word object as used herein, refers to an individual, identifiable item, unit, or entity, with a role in the 3D environment, and to all the functions and code associated therewith.

The invention disclosed herein is directed to the effects that changes to an object within a scene have on other objects within that scene, and to ways of structuring computer applications for virtual environments. In the preferred embodiment described herein, interaction with 3D objects in 3D scenes is described. It will be appreciated by the reader however, that many of the features described herein for 3D virtual reality, may be applied in other embodiments to flat shapes, 2D objects, scenes and the like, mutatis mutandis.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing illustration of the conceptual aspects of the invention. In the accompanying drawings.

DESCRIPTION OF THE PREFERRED EMBODIMENTS

Figure 1:
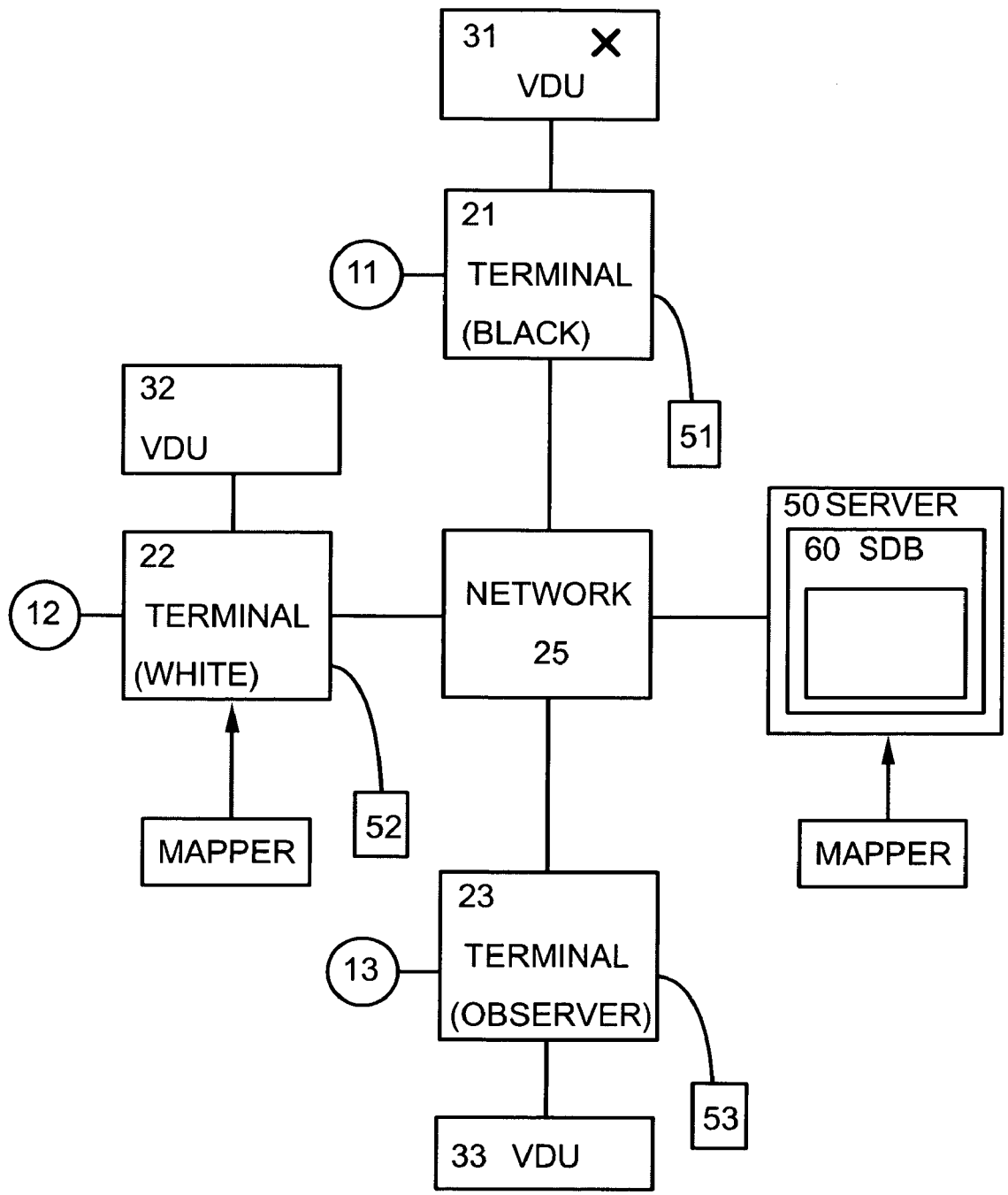
FIG. 1 is a schematic diagram showing a networked computing environment.

Before explaining at least one embodiment of the invention in detail, it is to be understood that the invention is not limited in its application to the details of construction and the arrangement of the components set forth in the following description, or illustrated in the drawings. The invention is applicable to other embodiments or of being practiced or carried out in various ways. Also, it is to be understood that the phraseology and terminology employed herein is for the purpose of description and should not be regarded as limiting.

Embodiments of the invention are applicable to a virtual environment that enables a plurality of users to interact with each other. Preferred embodiments are designed for networked computing environments, particularly very large, open networked environments such as the Internet.

Reference is now made to FIG. 1, which is a simplified block diagram showing how a plurality of networked users may interact within the same environment. FIG. 1 comprises three users 11, 12, 13 at client terminals 21, 22, 23 each connected to, or logged on to, a single server 50 via a network 25.

An interaction, made by a first user 11 interfacing with a first client terminal 21 is coded at the first client terminal 21, and transmitted to the server 50. The server 50 sends data to all logged on clients 21, 22, 23 updating them regarding the interaction. Networked environments of this nature may comprise many clients, and may also comprise a plurality of servers, or alternatively, a server that is, itself, distributed over a number of host computers on different nodes of the network.

The environment optionally comprises sophisticated, non-static, 3D scenes, optionally having a detailed 3D background, which may be viewable from different vantage points, and optionally comprises a limited, discrete number of objects selected from an almost infinite set of objects, that, because of the dynamic nature of some applications, may not even have been conceived by the original designer of a particular application. The various scenes are stored in a scene database, henceforth SDB 60.

The present embodiments provide a novel way of structuring software that is particularly appropriate to enabling a plurality of users to interact with scenes containing multiple objects within graphical applications for networked virtual environments. In some embodiments the objects that may eventually populate a scene may not be known in advance, and may not even have been defined when the scene was created. Also, different behaviors may be assigned to existing display elements.

It will be appreciated that the SDB can be used to monitor interactions originating with users, thereby to learn about individual users and their tastes and preferences.

A first preferred embodiment has four features that are described herein. The first feature is referred to herein as object splitting, the second feature as expert control, the third feature as relationships and the fourth feature as counter control.

Object Splitting

The first feature, known as object splitting, is a departure from the classic object oriented conception that considers an object to be an integral, autonomous unit, wherein all the data and code relating to the object is encapsulated within the object, that is, kept together in one place. Instead, the data and code comprising the object is divided into sub-units, each of which is encapsulated separately, and may be kept and implemented separately at the most suitable location. Thus, the display aspects of an object may be located at a client terminal where the object is displayed, and behavioral aspects for example, are located elsewhere. The separation of form and function in this manner also enables different functionalities and behaviors to be associated with the same display element. Although Object Oriented Programming (OOP) is valuable as a means of ensuring that different elements of complex programs are kept independent to some degree, minimizing undesirable interference and facilitating program maintenance, it has two disadvantages in particular: firstly, that the same object always has the same behavior, and secondly, that for virtual objects to display correctly at all nodes of a network such that users can interact therewith, the whole object, which invariably comprises relatively large amounts of data and code, must be transmitted to and from nodes of a networked environment. In object splitting however, there is a separation between aspects of the object that require downloading to the individual nodes so that the object is user sensible, and between other aspects of the object that need not be downloaded. This has two main advantages: firstly, a different behavior or function can optionally be ascribed to a rendered object as displayed, and secondly, the amount of data requiring transmission between nodes may be limited to that required for display purposes, which may result to greater running efficiency.

Figure 2:
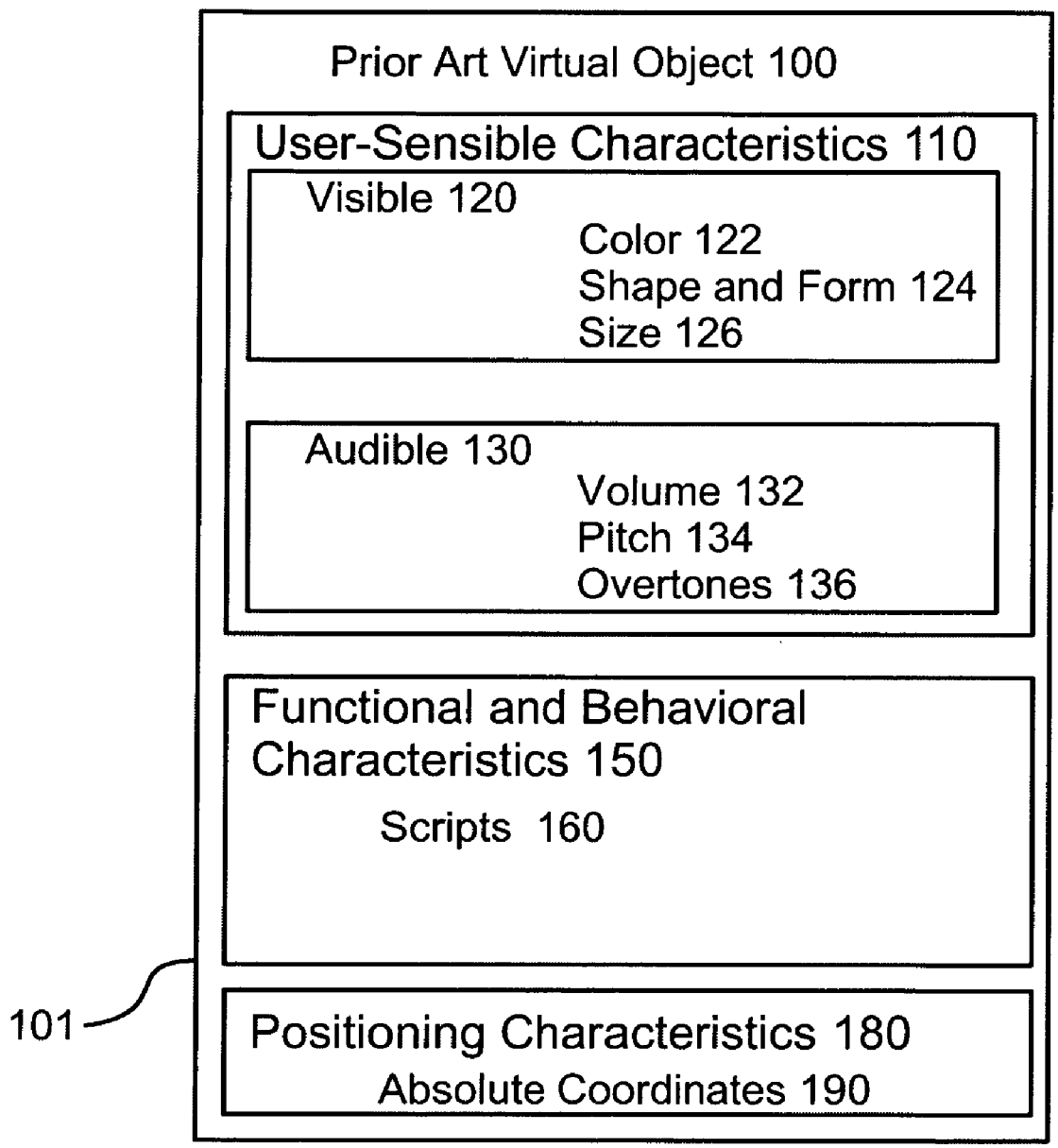
FIG. 2 is a schematic conceptual diagram illustrating the functional elements of a prior art virtual object.

Reference is now made to FIG. 2, which is a schematic conceptual diagram, showing the components of a typical prior art object 100. A prior art object 100 optionally comprises user-sensible characteristics 110, which may include visible display characteristics 120 such as colors 122, shape and form 124 and size 126, and may further include audible characteristics 130 such as associated sounds having volume 132, pitch 134 and overtones 136. Using suitable immersion equipment and interacting with the appropriate sense organs of the user, the object may, at least theoretically, also have a smell, a taste and a texture. The prior art object 100 further comprises functional and behavioral characteristics 150 such as scripts 160 and the like which are fixed characteristics of the object once the object has been compiled. In addition, the prior art virtual object 100 further comprises positioning characteristics 180 such as absolute Cartesian coordinates 190 with respect to the orthogonal axes of the 3D space.

All the above mentioned characteristics of the prior art object 100 are encapsulated as a single unit 101, and for the prior art object 100 to be available to any client 21, 22 or 23 (FIG. 1), for display and/or interaction thereat, in a networked environment, the entire prior art object 100 including all the code and data necessary for all characteristics must be made available to that client 21,22 or 23.

Since all the aspects of a prior art object 100 are traditionally kept together, whenever the object is introduced into a scene, all the associated data and code is required to be downloaded to all logged on clients 21, 22, 23 viewing or interacting with the scene. All logged on clients 21, 22, 23 require updating in real time, of any interaction with the object, such as the object being moved by one of the clients, for example. In consequence, networked virtual reality applications comprising prior art objects usually require very large amounts of data to be transported between scenes, and since this type of software structure generally requires prohibitively large bandwidth or is unacceptably slow running, it is not ideal for networked computing, and puts an unacceptable data transfer requirement for Internet based applications requiring interaction between many users.

Figure 3:
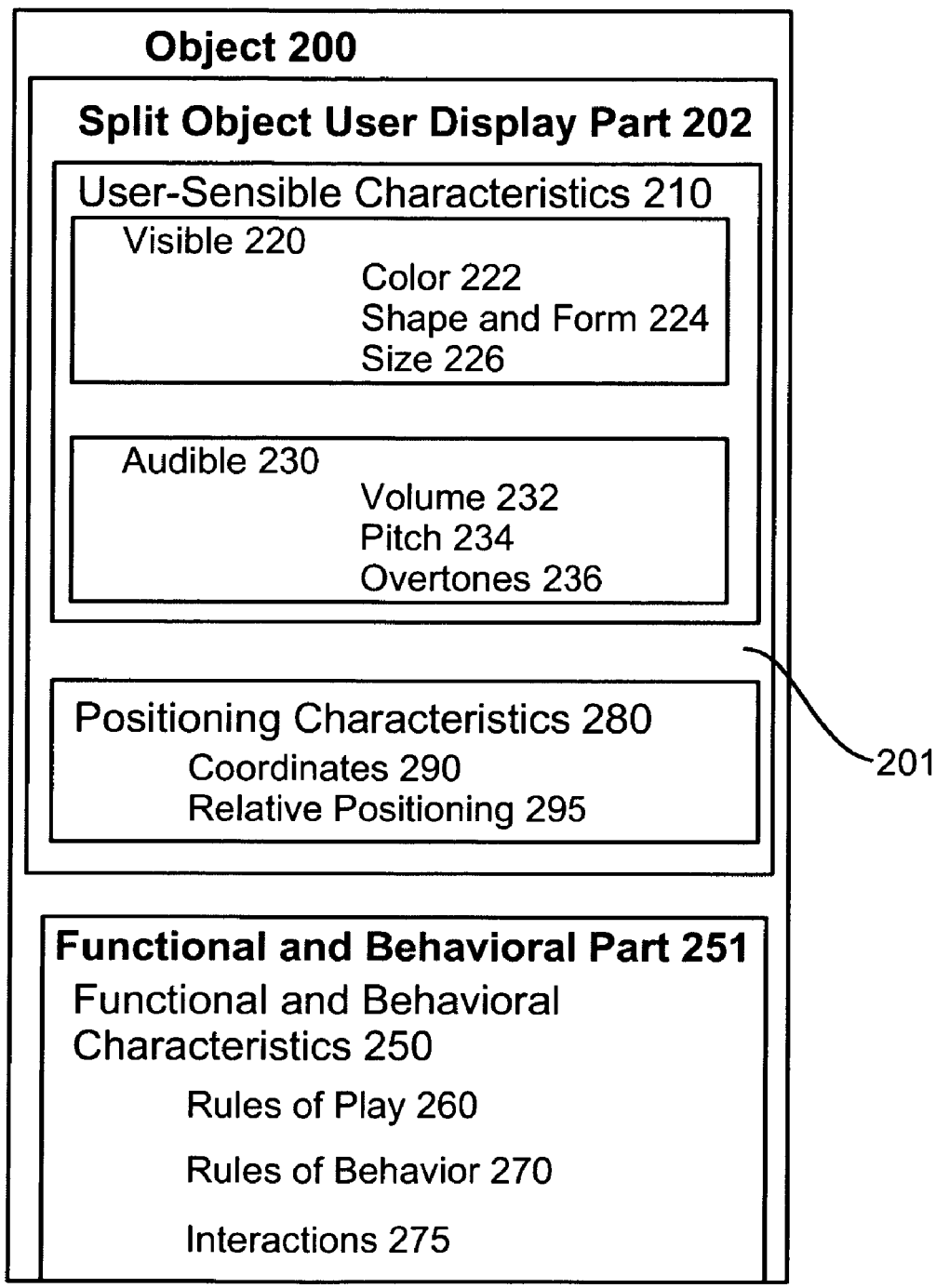
FIG. 3 is a schematic conceptual diagram illustrating the functional elements of a split virtual object and an arrangement thereof, according to an embodiment of the present invention.

Reference is now made to FIG. 3, which is a schematic conceptual model of the first feature of the present embodiment, known as object splitting. FIG. 3 shows how code and data relating to user-sensible characteristics 210 of, and to the positioning characteristics 280 of the object 200 may be encapsulated as a split object user display part 202, independently of the functional and behavioral characteristics 250 which may be encapsulated as a functional and behavioral part 251. The user-sensible characteristics 210 again optionally comprise visible display characteristics 220 such as colors 222, shape or form 224 and size 226, and audible characteristics 230 such as associated sounds having volume 232, pitch 234 and overtones 236. Here again, using suitable immersion equipment and interacting with the appropriate sense organs of the user, the object may, also have a smell, a taste and a texture. Position characteristics 280 optionally include coordinates 290 that relate the object 200 to its absolute position in the virtual space, and optionally include relative positioning 295 of the object with respect to other objects within the scene. Functional and behavioral characteristics 250 optionally include interaction with other objects 275.

Non-display-related characteristics such as functional and behavioral characteristics 250 optionally reside elsewhere in the networked environment than the location of the split object user display part 202, which comprises user-sensible characteristics 210 and positioning characteristics 280. The aforementioned non-display-related characteristics might reside on the server 50 for example, and may optionally comprise rules of play 260, rules of behavior 270 and the like, and may optionally be structured as, and controlled by experts, as will be explained in detail below.

Structuring objects in this split form, enables only the split object user display part 202, i.e. the parts of an object 200 that relate to its user-sensible detectivity 210, specifically its visual display aspects 220, to be downloaded to the client terminal 21, 22 or 23. By not downloading characteristics relating to the functionality and behavior of the object 250, and retaining them centrally for example, object splitting enables the quantity of data that requires transporting between networked nodes to be considerably reduced, and facilitates the maintaining of control centrally, without compromising on how objects are displayed at the individual client terminals.

The split object user display part 202 comprises all user-sensible aspects of the virtual object, that is, all aspects that may be displayed at the user client terminal 21, 22, 23. These include details of the position 280 and visible characteristics 220 (appearance) of the object 200, but also other characteristics that may be sensed, such as audible characteristics 230 (associated sounds). Special immersion equipment may, in addition, provide a virtual taste, smell or touch sensation, and these characteristics may, where available, also comprise the split object user display part 202.

The split object user display part 202 is preferably available via the network 25, and may be downloaded to the client terminal 21, 22, 23 of any logged on user 11, 12, 13 so that the object 200 may be displayed within the virtual environment. The other characteristics may be encapsulated as a split object function and behavior part 251. This non-display part remains in the scene database 60, and is not downloaded to the client terminal 21, 22, 23. The non-display part may, in other embodiments, be stored in a plurality of locations, distributed around the World Wide Web for example, as a distributed database. The display aspects of the objects that are downloaded to the user terminal, may, of course, not actually be stored in the scene database, which may merely reference the locations of the display aspects, for downloading, the locations being distributed around the Internet. Furthermore, as mentioned above, one may use the SDB to learn the behaviors of users for future reference.

Storing the display aspects of an object, separately from the functional and behavioral aspects enables the same objects to be assigned different behaviors and used in a variety of scenes. Thus for example, a counter restricted to two dimensional space may be used for Snakes-and-Ladders or Ludo, or alternatively be assigned three dimensional mobility, and allowed to move in 3 dimensions and then used for tiddly-winks. Similarly the same artwork may be used with one set of functions on one scale, as a virtual toy or model, and on another scale as a representation of the real thing, for example.

Figure 4:
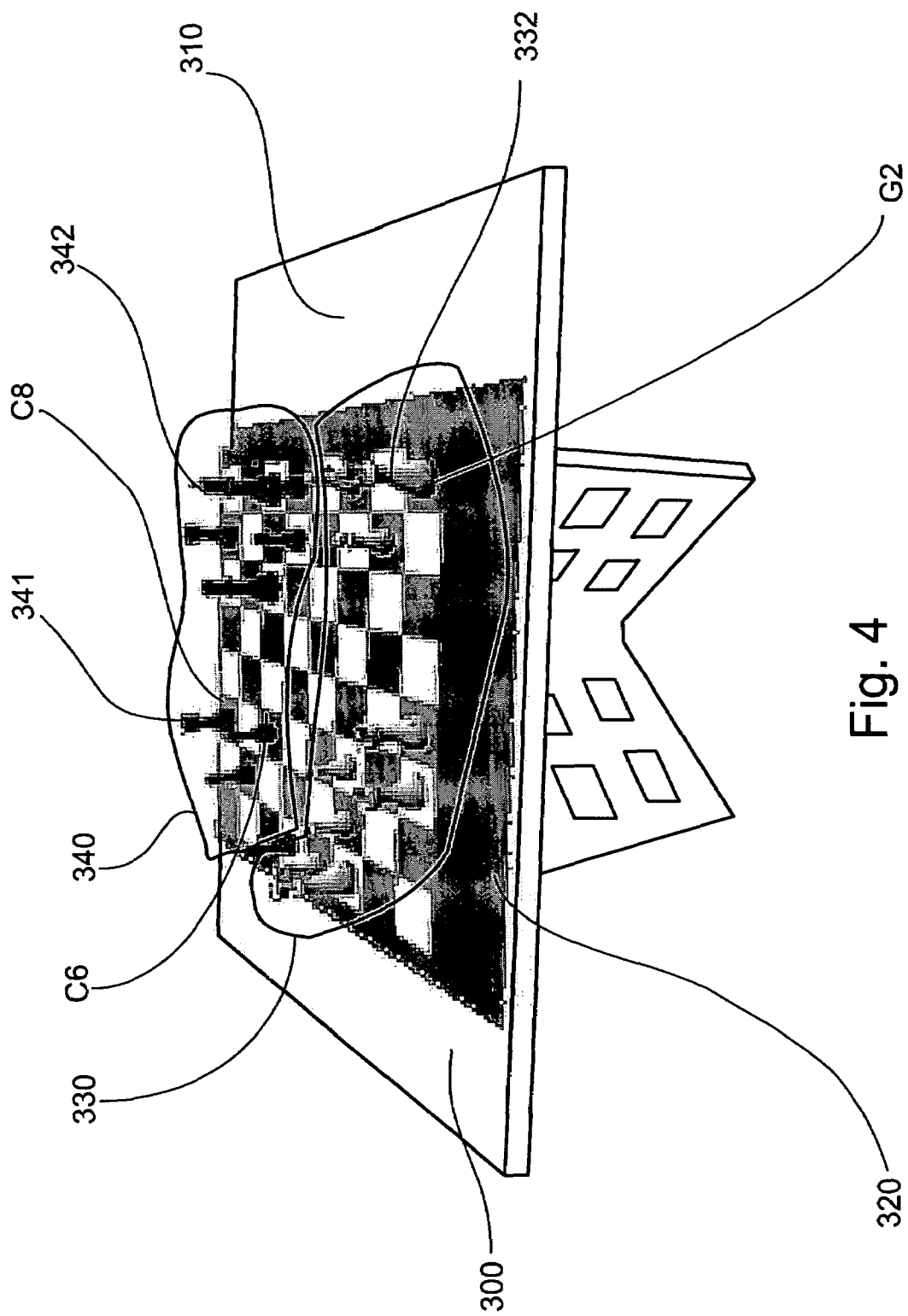
FIG. 4 is a perspective view showing a chessboard with chessmen thereon, on a table within a virtual reality environment.

Reference is now made to FIG. 4, which is a perspective view of a table 300 having a Right side 310, a chessboard 320, white chessmen 330, and black chessmen 340. Particular attention is drawn to the black rook 341 on C8, the black king 342; the white pawn 332 on G2, and to squares C8, G2 and C6.

Optionally, by incorporating the object-splitting feature, only the display aspects of chess, i.e. the appearance of the board and chessmen need be downloaded to the user terminal. Then, as a player moves a chessman, only details of the move require to be transmitted to the scene database 60 for optional evaluation, and so that the server, the second player, and any observers, are updated regarding the move.

With reference now to FIGS. 1, 3 and 4, for the scene illustrated in FIG. 4 to be correctly displayed on a client terminal VDU 31, 32, or 33, the coordinates 290, form 224 and color 222 of the table 300, the chessboard 320, and all chessmen 330, 340 must be downloaded to the terminal VDU 31, 32, or 33. The functional aspects of the chessmen however, such as the legality of a particular move, such as moving the black rook 341 from C8 to C6 for example, need not be downloaded.

Expert Control

The object splitting feature is a concept that can be generalized, and applied to the scenes themselves, or to parts thereof, to provide the second feature of the present invention which is a generalized form of the concept of the first feature, but wherein the functionality is applicable to sets of objects. Such functionality of sets of objects within a virtual environment becomes dissociated from the objects themselves, and thus may be associated with the 3D environment. Controlling sets of objects in this way is referred to herein as expert control. Thus, the second feature, expert control, is a way of handling sets of objects and events in the context of flexible 3D virtual environments, wherein for example, different scenes may be displayed, new objects can be introduced in real time, relationships between objects can be modified and graphic properties of objects can be changed.

Expert control is provided by dedicated control elements, referred to hereinbelow as experts, and using experts is a way of structuring applications to provide functionality to objects at the SDB level. The scene database (SDB) itself facilitates the display of the different objects within the various scenes, and allows interactions of a general nature, such as the moving of the various objects, and their removal from a scene. In particular applications, where there may be a need for a more specialized and dedicated control over parts of scenes, experts may be provided. These experts are dedicated program elements external to the objects themselves, associated with the scenes, but optionally available as modular add-ons to the scene database 60.

An application where using an expert would be advantageous is for playing chess. Chess is a game played by a well-defined set of rules. These rules, include for example, (i) set the chessmen in their starting positions, (ii) ensure that White starts, (iii) only allow one chessman to occupy any square at any one time, (iv) assign the legal moves to the different types of chessmen, (v) require the players to take turns moving, and (vi) force a player whose king is in check to remedy the situation. Although chess must be played in accordance with these and other rules, the rules themselves may be kept as part of an autonomous program unit or expert, which may be retained at the server for example. And, if a move made by a user is not an allowable move for that chessman, the move may be rejected by the expert.

Experts may be implemented as shared libraries, for example, as DLLs under the Win NT/98 operating systems. Experts are preferably associated with the scene database (SDB), and all SDB commands that concern the domain of expertise are handled thereby. In a preferred embodiment an expert is called up as a result of a user-interaction with an object. Thus if a user interacts with an object at his client, the object sends a message to the SDB. Each expert that successfully connects with a scene may register as a valid SDB expert, and any message or command that arrives at the SDB will be passed in turn through all valid experts until processed.

Each valid expert determines whether a command is of relevance to itself, in which case, the expert will process that command. If the command is not relevant to the expert, or no response is appropriate, the command is returned to the SDB, which preferably passes the command on to the next valid expert in turn. If there are no other valid experts, the SDB 60 processes the command itself. Thus the functionality and behavior of objects within a scene may be handled by an expert and the display aspects of the scene may be handled by the scene database. As described above, changes of a functional or behavioral nature are considered before the display aspects. This order, can, of course be changed around.

By command processing, as well as sending the command for execution, such things as changing or deleting the command or spawning new commands are included. Once processed, a command is not passed on to further experts. Experts do not interact directly with the clients or with SDB data. Instead experts perform interactions indirectly, employing the SDB command mechanism.

Figure 5:
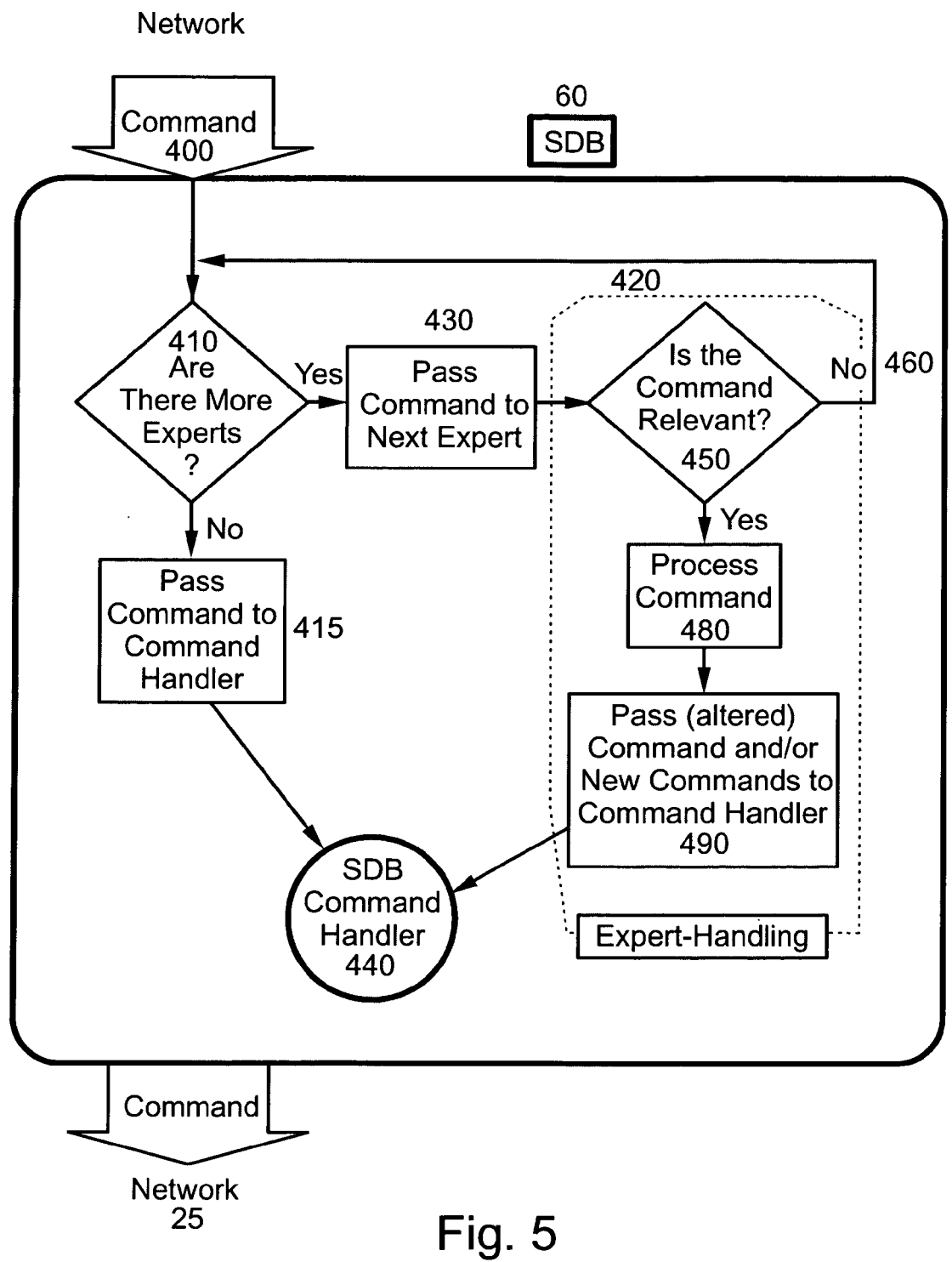
FIG. 5 is a flow diagram that illustrates how a command reaching the SDB is processed.

Reference is now made to FIG. 5, which is a functional block diagram that illustrates how a command reaching the SDB is processed. FIG. 5 shows a command 400, the scene database or SDB 60, a query regarding additional experts 410, a next expert 420, a conceptual indication of how a command is passed on 430, the SDB command handler 440, a relevance query 450, a conceptual indication of how a command is passed back 460, a conceptual indication of how a command is processed 480 and response commands 490. A command 400 reaches the scene database or SDB 60. An expert query 410 regarding the existence of additional experts 410 is asked. If the response to the expert query 410 is YES, indicating the existence of further experts, the command is passed on 430 to the next expert 420. At the next expert a relevance query 450 is asked, that is to say, the expert decides whether it may process the command. If not relevant, the command is passed back 460 to the expert query 410. If the command is relevant however, that is, if the current expert may process the command, the current expert 420 processes 480 the command, and the processed, i.e. altered command, and/or new commands spawned thereby 490, are passed on to the SDB command handler 440. All response commands 490 whether generated by the experts 420 or by the SDB 60 itself, are transmitted from the command handler 440 to the network 25, whence all clients are informed of resulting changes. If an expert 420 cannot handle a command, the command is sent back to the SDB 60, which again queries whether there are more experts 410, if the answer is positive, the next expert in line is passed the command. If the answer to the more expert query 410 is negative however, i.e. if there are no more experts, the command is passed on 415 to the command handler 440 of the SDB, which handles the commands directly.

Command processing by the SDB with experts as described above, may be illustrated using a games example. Suppose an SDB is managing scenes of various table games, enabling a plurality of clients to compete in Backgammon, Checkers, chess and Snakes & Ladders tournaments for example. This is shown in FIG. 6 below.

Figure 6:
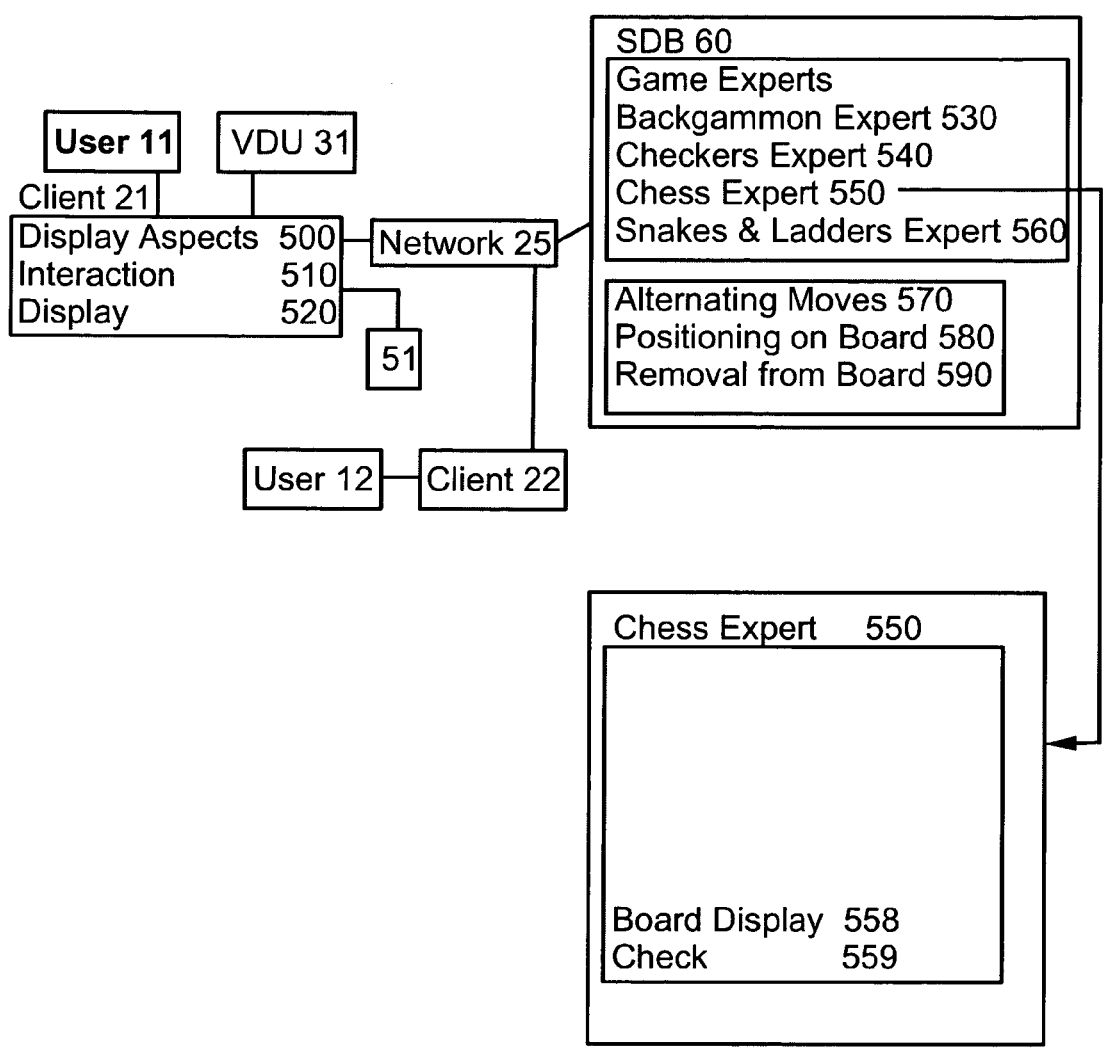
FIG. 6 is a schematic block diagram illustrating how an SDB may comprise experts associated therewith.

Reference is now made to FIG. 6, which is a schematic block diagram that shows how a first user 11 at a client 21 may play an interactive game of chess via a network with a second user 12 at a second client 22. The user 11 views the scene via his VDU 31, and makes interactions therewith via his mouse 51. The split object user display 500 and interaction 510 parts are downloaded to the client 21. The clients are linked via the network 25, to an SDB 60 on a server. The SDB 60 is linked to a plurality of experts such as a Backgammon expert 530, a Checkers expert 540, a chess expert 550 and a Snakes & Ladders expert 560. The chess expert preferably comprises individual chessman expertise; for example king expertise that knows about the movement rules for a king. The chess expert 550 preferably further comprises other chess-specific functions such as board display 558 and checking 559. The SDB itself directly handles the alternation of moves 570, the positioning of pieces on the game boards 580 and the removal of pieces from the various games 590. In other words, the SDB merely controls the graphical display, and allows the manipulation of chessmen and other display elements. The SDB knows nothing regarding their function or allowable behavior.

The user 11 views the position as displayed on his VDU 31, and interacts therewith, via his mouse 51. Only the split object user display and interaction parts 500 of the chessmen 330, 340 (FIG. 4) and chessboard 320 are available at the client 21. Thus if the user 11 decides to move a rook 341 and selects it using the mouse 51 and repositions the chessman thereby, a signal is transferred to the SDB 60 via the network 25. The legality of the move and how the rook moves and displays with respect to the chessboard are functions controlled by the SDB 60 on the server 50.

The SDB 60 allows object manipulation and display, and is preferably of a general nature. Thus if a games application SDB 60 is considered, the SDB 60 itself may handle the common aspects of board-games such as the alternation of moves between players 570, the positioning of pieces on the squares of the game-board 580, and their introduction to and removal from the board 590. Alternatively, some or all these functions may be assigned to experts as deemed appropriate.

Referring back to FIGS. 2, 4 and 6; with Black to play, and wishing to move the rook 341 from C8 to C6, if the user 11 playing Black selects the rook 341 on C8 and moves it to C6 with his mouse for example, the move arrives as a command at the SDB 60 and is passed on to the Backgammon expert 530 first. Not recognizing the grid coordinates or the object rook 341, the Backgammon expert 530 does not interact with the command, and returns it to the SDB 60. The SDB 60 passes the command to the next expert 430, which is a Checkers expert 540. The Checkers expert 540 does not recognize the rook 341, and thus passes the command back 560 to the SDB 60. Turning to the next expert in turn, the command is now addressed to the Chess expert 550, which recognizes both the rook 341 and the coordinate system.

The Chess expert 550 queries the move 450, checks that there is a Rook 341 on C8, that it is Black's turn to play, that such a move is legal, that is, does not expose the Black King 342 to check for example. If the move is deemed legal, that is if it satisfies the rules of chess, the command is accepted, if not, an illegal move response is generated. The SDB does not pass on the command to further experts such as the Snakes & Ladders expert 560, but accepts or rejects the move, and if the move is accepted, an appropriate command to implement the move is sent to all logged on clients 21, 22 and 23 viewing the relevant scene. Since the Chess expert 550 processes the command, the command is not passed on to the Snakes & Ladders expert 560 at all. In the specific example discussed above, the move is rejected as C6 is occupied by a black pawn, and two pieces cannot simultaneously occupy the same square.

As shown above, structuring applications using object splitting to separate the displaying of objects from their behavior, or to separate form from function, and then to control the behavior of objects using experts, is an effective way of enabling multiple user interaction with a plurality of objects in dynamically changing scenes in a networked environment, enabling the introduction of extra objects at any stage, in a modular manner. The advantages of this structure are that great flexibility is ensured, and objects with restricted allowable behavior, or even a complex of associated objects having a complex list of associated rules such as a chess-set, can be introduced into a scene, and scenes may be provided, having a unified behavior for a variety of objects.

In an embodiment known as a mapper, shown in FIG. 1, dynamically changing data received from an external source may be used to affect objects in a three-dimensional scene. For example, the 3D scene may comprise bars of a bar chart and externally received data may set the height and/or color of the bar. Thus the bars of a bar chart may be updated dynamically, and used for following stock market movements or currency fluctuations dynamically. The external data may come from an external website on the Internet for example.

The same scene could also be used to enable the remote monitoring in real time, of vitality data of a patient, where sensor signals could be transmitted to the same scene. Indeed, the same dynamically changing data could be displayed using a variety of appropriate graphic display forms.

The present embodiment comprises two further features: relationships and counter control. These two features are ways of controlling the behavior of objects, such that when an interaction occurs with a selected object, other objects, associated with or having a relationship with the selected object, also participate in the interaction. Such interactions include color changes, status changes, movement changes etc.

Relationships

Relationships are a way of allowing a trigger applied to a first object to cause changes or actions to be applied to other objects. The relationship feature, as will be described below, enables a first object to be comprise an association or a link to one or more other objects In the prior art, problems occur such as the following: Prior art objects are traditionally located by their absolute positions in virtual space, not by any association with other objects. If a prior art object is moved, it will generally have no effect on other objects in its vicinity. For example, if a chessboard is moved, since the chessmen thereon are separate objects, the chessmen thereon are not moved. They stay where they are in virtual space and in consequence, the chessboard moves with respect to them. That is, their position relative to the chessboard changes.

Figure 7:
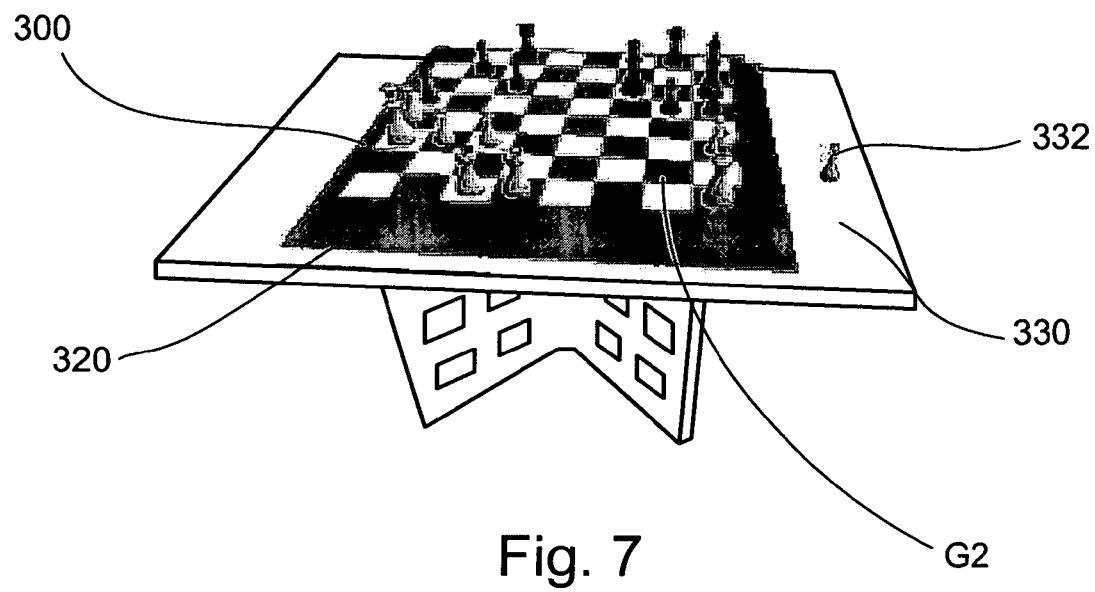
FIG. 7 is a perspective view of the chessboard with chessmen thereon, on a table within a virtual reality environment of FIG. 4, with a white pawn, having been removed from the chessboard and placed on the tabletop to the right thereof.

To illustrate the problem in more detail, reference is made to FIG. 7, with respect to which, the effects of various interactions with the chess scene shown in FIG. 4 are illustrated.

With reference now to FIG. 7, which shows the chess position of FIG. 4, with one change—the white pawn 332 has been removed from square G2 of the chessboard 320 and placed on the right side 310 of the table 300. Such a move could occur as pieces are manipulated to set up a chess position, for a chess problem for example. When moving from the scene shown in FIG. 4 to the scene shown in FIG. 7, since the pawn 332 has been moved in virtual space, and the table 300, board 310 and other chessmen 330, 340 were not moved, the position of the pawn with respect to table 300, board 310 and other chessmen 330, 340 is changed. That is, the pawn is moved in absolute terms, with respect to the coordinate system of the scene, independently of the other objects in the scene. This type of independent repositioning of objects in virtual reality scenes is known in the prior art, and for some applications is adequate.

Figure 8:
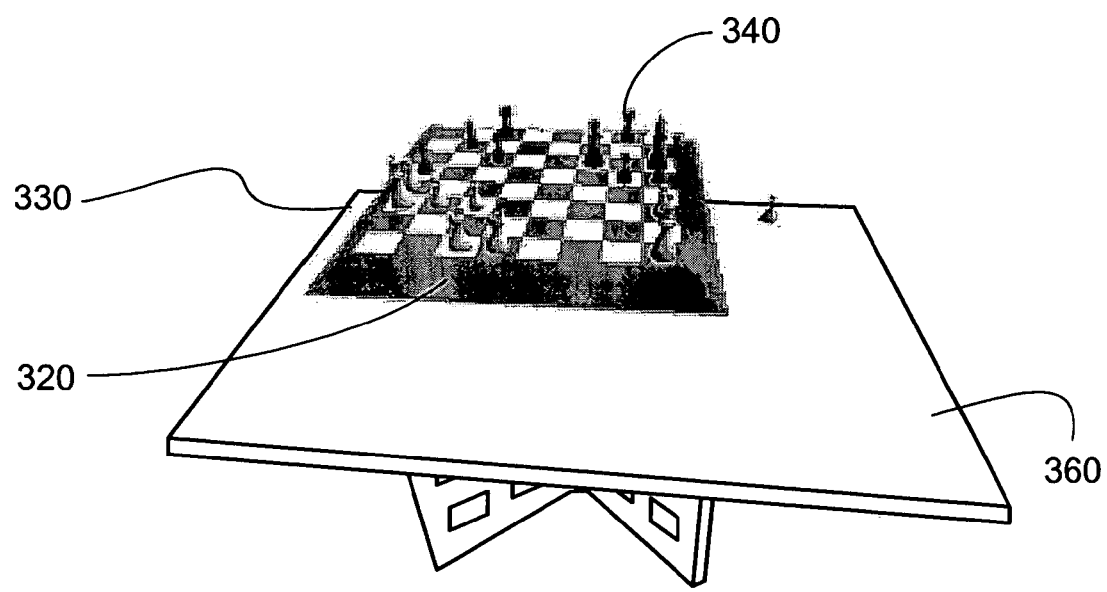
FIG. 8 is a perspective view of the chessboard with chessmen thereon, on a table within a virtual reality environment of FIG. 7, with the table moved forward, leaving the chessboard and pieces behind.

The independent movement of selected objects has limitations however. Starting from the position shown in FIG. 7, having moved the pawn 332, if now the table 300 is moved, perhaps towards the user, the scene following prior art repositioning norms, will appear as illustrated in FIG. 8. Since the chessboard 320 and chessmen 330, 340 have not been moved, and since they are positioned in absolute terms in virtual space, the chessboard 320 and chessmen 330, 340 remain in their previous positions. That is, the movement of the table 300 leaves behind the chessboard 320 and chessmen 330, 340, and, for many applications, this type of result would be considered undesirable. In contrast, to better reflect the behavior of a real table, chessboard and chessmen, one may require that moving the virtual reality table 300 of FIG. 7 results in the chessboard 320 and chessmen 330, 340 moving with it.

The third feature, relationships, is a way of overcoming the aforementioned problem. Using relationships, virtual objects are linked together so that they may interact together, so that a trigger applied to a first object causes changes to be applied to related objects. For example related objects may be moved together, keeping the same relative positioning there between. Other possible interactions include associated pieces undergoing color changes together, making a move in a chess game, may start one's opponent's chess clock ticking, or a stretch applied to a first object may be applied to associated objects. In a preferred embodiment, the relationships applied to an object are stored in a table. A trigger applied to the object preferably has a definition as to types of relationships to which it applies, and the table is searched to find those objects having the defined relationship type. The trigger is then used to apply an action to the objects found. The action may be the same as that applied by the trigger to the first object or it may be something different. For example the trigger may be selection of an object with the right mouse button. The selected object is caused to fire a gun. Related objects are any objects belonging to a group "enemy" which are in the line of fire, and the trigger causes the related objects to suffer damage.

The relationships feature may be further illustrated by considering a chessboard with chessmen thereon, and a chessman, such as a pawn, associated therewith, but not situated thereon as shown in FIG. 7. Considering the chessboard 320 now, let us imagine that, instead of moving the table, the chessboard is moved. To better reflect reality and to avoid the problem described above, the chessmen 330, 340 thereon may be defined as having a motion relationship with the chessboard 320. Thus if the chessboard 320 shown in FIG. 7 is selected and moved away from the table 300, to be eventually put down elsewhere, on another piece of furniture perhaps, the chessmen thereon can be defined as having a relationship therewith, reflecting real world behavior, and the chessmen will move with the chessboard. The above example illustrates a positioning relationship comprising a vertical juxtaposition, where moving a lower object having such a positioning relationship with an upper object causes the upper object to move with it, in the manner that real world objects in vertical alignment will move together. In a virtual environment, positioning relationships between objects may result in consequences that do not reflect the behavior of real world objects however.

A relationship may reflect a conceptual type of associative relationship, such as Keep With or Keep In Same Relative Position With. Here, the association may not reflect the physical behavior of real objects in the real world. As illustrated by comparing the scene in FIG. 7 with the scene in FIG. 8, associated objects not actually in play, may also have a relationship with the chessboard 320. It may be advantageous if the chessboard 320 is moved, for the pawn 332 that has been removed from the chessboard 320, to move therewith as well, keeping its same relative position with respect to the chessboard 320, despite it being removed from, that is situated off, the chessboard 320. This is shown in FIG. 8, where all chessmen including the pawn 332, move with the chessboard. Although this behavior is not analogous to the real world behavior of chessmen and chessboards, it is a useful feature. It is particularly valuable if, for example when the chessboard is selected and removed from the scene completely, all chessmen, whether situated on the board, or, as in the case of the white pawn 310, are situated nearby, are removed as well.

Relationships of this type typically have a move-with nature, such that a first object having a move-with relationship to a second object will retain a relative position with the second object as it is moved. A relationship of this type may be a one-way relationship, in which case, if the second object is moved, the first object moves with it, but moving the first object, has no effect on the second object. Alternatively, a relationship of this type may be a two-way relationship, in which case regardless of which object is actively moved, the two objects remain together. A one-way relationship is the type preferred for chess scenes for example, where moving a chessboard in virtual space results in the chessmen moving in virtual space such that there is no relative movement between chessboard and chessmen, however the movement of a single chessman does not affect the position (in absolute terms), of the chessboard or other chessmen. In contrast, a two-way relationship may be the relationship between a virtual cyclist and a virtual bicycle for example, where it may be desirable to keep the cyclist and bicycle together regardless of which is selected and moved.

EXAMPLE

Working embodiments of the present invention were implemented in GInlt, which is a scene database that provides a multiple-user networked environment that is adapted to the introduction of objects into scenes.

GInlt uses the C++ programming language, which is a language adapted to object Oriented applications, and is thus well suited to virtual reality.

To facilitate the relating of one object with another, three types of relationships were defined; a first type is an explicitly established relationship. Chessmen 330, 340, on a chessboard 320, enjoy a relationship of this type. A second type of relationship is a query relationship. This type of relationship results from a query expressed in the database query language. Preferably, in the query type of relationship a set of related objects is defined at the time the trigger is applied by conditions obtained in the query. The query relationship thus allows dynamic relationship establishment and the same trigger may bring about interactions with different objects at different times.

Finally, an object may be related to itself, meaning that the query may relate to a property of the object itself.

Counters

A fourth feature of this embodiment, referred to herein as counters, is a family of restriction mechanisms that may prevent interactions originating from a first object in virtual space spreading to an unlimited number of directly and/or indirectly associated further objects.

There is an inherent problem with allowing selected objects to have relationships with other objects in their vicinity, in that interacting with an object may result in consequential further reactions; that is, in uncontrollable or undesirable consequences and knock on effects since the other objects themselves have relationships with further objects.

Figure 9:
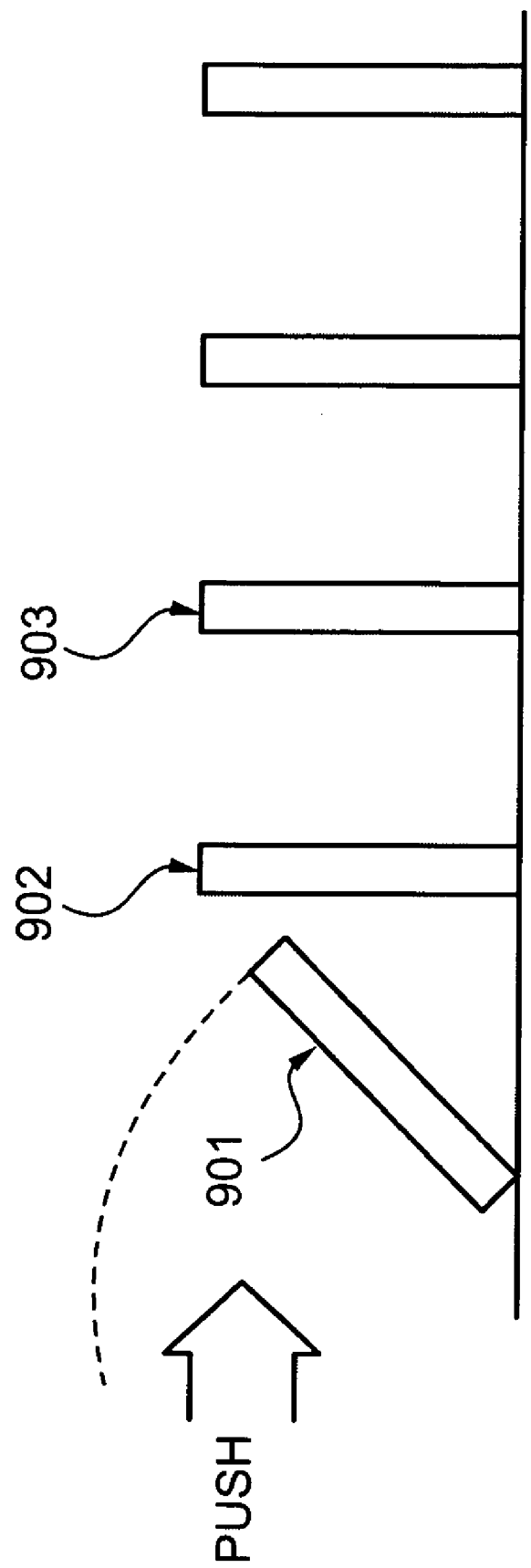
FIG. 9 is a side view of a plurality of dominoes.

Reference is now made to FIG. 9, which uses dominoes 901, 902, 903 to illustrate what is meant by consequential further reactions. Knocking over domino 901, results in domino 902 being knocked over as a direct consequential reaction. If, in consequence of domino 902 falling, it knocks over domino 903, domino 903 can be considered as being knocked as an indirect consequential reaction. The falling of domino 902 may also be considered a first order consequential reaction, and that of domino 903 may be considered a second order consequential reaction. Subsequent consequential reactions are labeled third order, fourth order and so on.

In many applications only small numbers of consequential further reactions occur in a controlled manner to a small set of interacting objects. But uninhibited, relationships between objects may result in loops of consequential further reactions of the type A>B>C>A, where > implies 'moved in consequence with'. This may result in undesirable infinite loops of consequential further reactions of the type that could lead to a virtual person picking himself up by tugging on his shoelaces. Alternatively, one object may enjoy a relationship with a further object, which itself is related to a further object forming a long, open ended, uncontrolled chain of objects that may move in response to a selected object being moved. It is to prevent problems of this nature, that the fourth feature, known as counters, is introduced.

Counters are a means for restricting consequential further reactions. Three types of counters are defined: (i) Limited number of consequential further reactions to directly related objects, (ii) Limited total number of consequential further reactions to related objects, and (iii) Limited number of dependency levels for consequential further reactions. The interactions considered by the counter may comprise all interactions of the given order or just those interactions for a defined set of objects.

Figure 10:
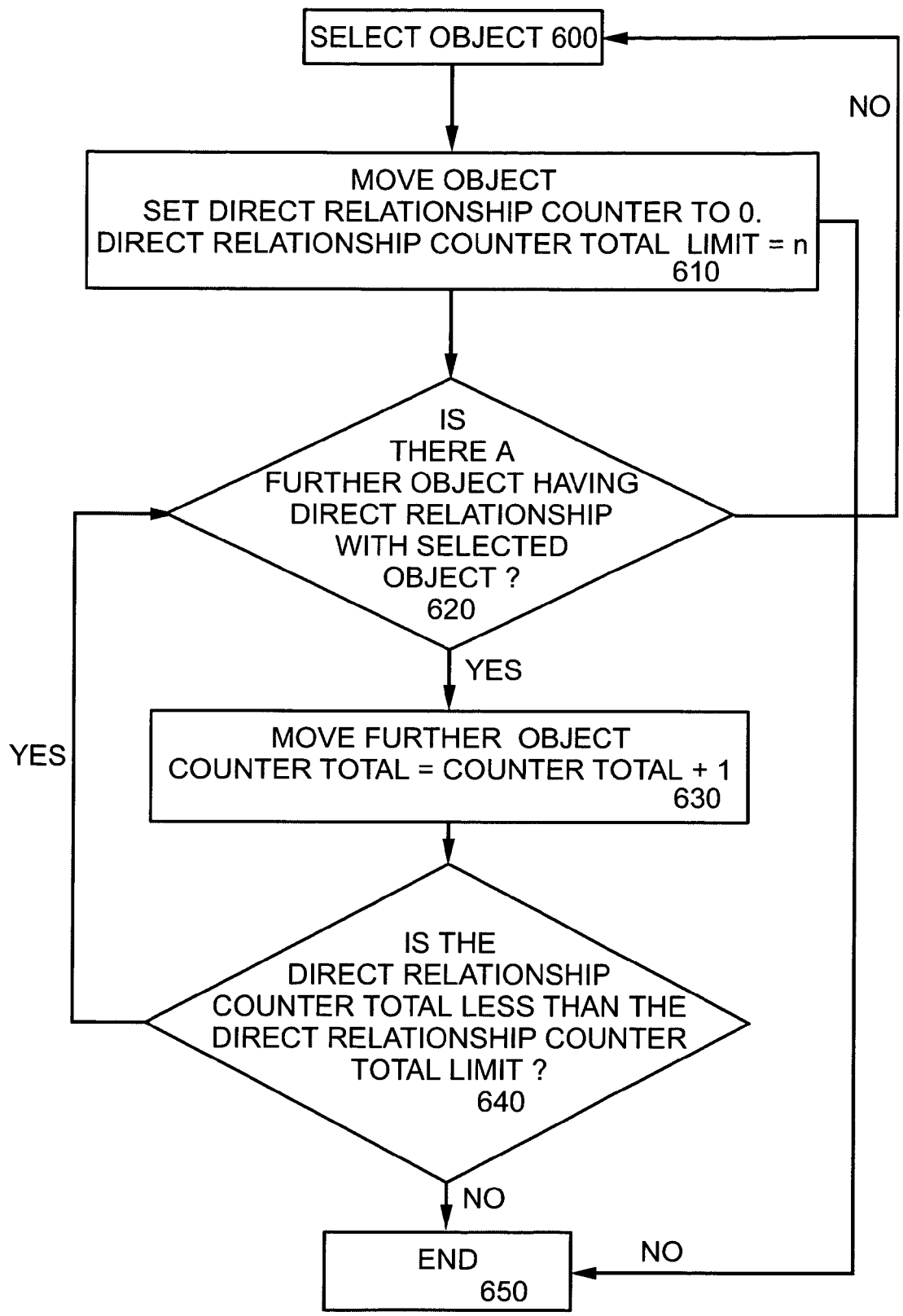
FIG. 10 is a flow diagram illustrating an interaction counter mechanism.

(i) Reference is now made to FIG. 10, which is a flow diagram illustrating a method for limiting the total number of consequential further reactions to related objects, by using a counter mechanism that keeps tally of related reacting objects. If an object is selected 600, using a mouse for example, and the object is moved 610, the movement of the object causes the reacting objects counter to be set to zero. The object has a related reacting objects counter total limit of n. Now, the existence of an object having a direct relationship with the selected object is queried 620, if there is a further object having a relationship, it is moved and the directly related reacting objects counter total is adjusted to the previous total +1, that is a running total is kept 630, If the adjusted running total is less than the limit n 640, the existence of an object having a relationship with the selected object is again queried 620. If not, that is, if the total limit of n is reached, further movements of related objects are not allowed, and the associated movements end 650. If the response to the further directly related objects query 620 is negative, that is, there are no further directly related objects, the associated movements of related objects end 650. Thus if a chessboard is considered, a limit of not less than 32 associated objects would be required to enable all chessmen to move with the chessboard, at any stage of a chess game. If in addition, to the chessmen, it were deemed desirable for other objects, such as a chess-clock to be directly related to the chessboard, a higher limit to the allowable number of directly related objects would be required. For many objects however, such as chairs, boxes and the like, in many applications, a more modest number of directly related reacting objects would be acceptable. In the above example the relationships involved were all direct or first order relationships. However the counter could also be applied to interactions stemming from any order of relationship or all orders of relationship. Likewise the counter could be applied to relationships of different types, for example all chess pieces of the same color.

(ii) Referring again to FIG. 10, an example is given in which the counter mechanism is applied to any relationships of whatever order. Instead of just limiting the number of reacting objects directly related to a first object, it may be preferable in some embodiments, to limit the total number of directly and indirectly related objects associated with a first, directly moved object. A directly related object is an object having an express relationship with an object actively moved, by a user interaction for example. In contrast, an indirectly related object is an object that is only related to the object actively moved via an intermediate object. If an object is selected 600, using a mouse for example, and the object is moved 610, the movement of the object causes the relationship counter to be set to zero. The object has a counter total limit of n. Now, the existence of an object having a relationship with the selected object is queried 620, if there is a further object having a relationship, whether it is directly related, or whether it is indirectly related by having a relationship with a further object that has a relationship with the object that is selected, the related object is moved and the counter total is adjusted to the previous total +1, that is a running total is kept 630, If the adjusted running total is less than the limit n 640, the existence of an object having a relationship with the selected object is again queried 620. If not, that is, if the total limit of n is reached, further movements of related objects are not allowed, and the associated movements end 650. If the response to the further related objects query 620 is negative, that is, there are no further related objects, the associated movements of related objects end 650.

This can be overly restrictive however, thus considering the chess scene in FIG. 8 again, if the total number of directly and indirectly related objects associated with the table is limited to say 11 objects, that is n=11, it proves impossible for moving the table to result in the chessboard and pieces moving with it. The chessboard 320 will move, as will the pawn 332 that is directly related to the table 300, but only a further 11-2 objects may move, and if, for example the application considers black chessmen first, the nine black chessmen 340 will move with the chessboard 320, and thus with the table 300. The white chessmen 330 however, will not be moved because of this counter restriction, and will be left behind. This may result in the scene as shown in FIG. 10 where the black chessmen 340 maintain their position with respect the chessboard 320 and table 300, as does the pawn 332 that is resting on the table 300 at the right side 310 thereof.

Whereas the white chessmen 330, as the total related objects counter has reached the number 11, do not move with the table, and remain in their previous positions in virtual space, as defined by their coordinates therein. Although not particularly suitable for chess-scenes, this type of limitation is important for more open-ended virtual reality applications, such as The type of counter described above need not count all related objects. The same counter may count objects restricted to a subset. Thus referring again to a chess example, only chessmen may be counted, and other objects associated with a chessboard, such as chess-clocks, may be ignored by the counter. Alternatively, only white chessmen may be counted.

A plurality of counters may also be used with the same object. This feature may be useful in warehousing and stock control for example, where say, five objects of one type, and twelve objects of another are counted. The first counter described, that only counts directly related objects, may also only count a subset of objects, mutatis mutandis.

Figure 11:
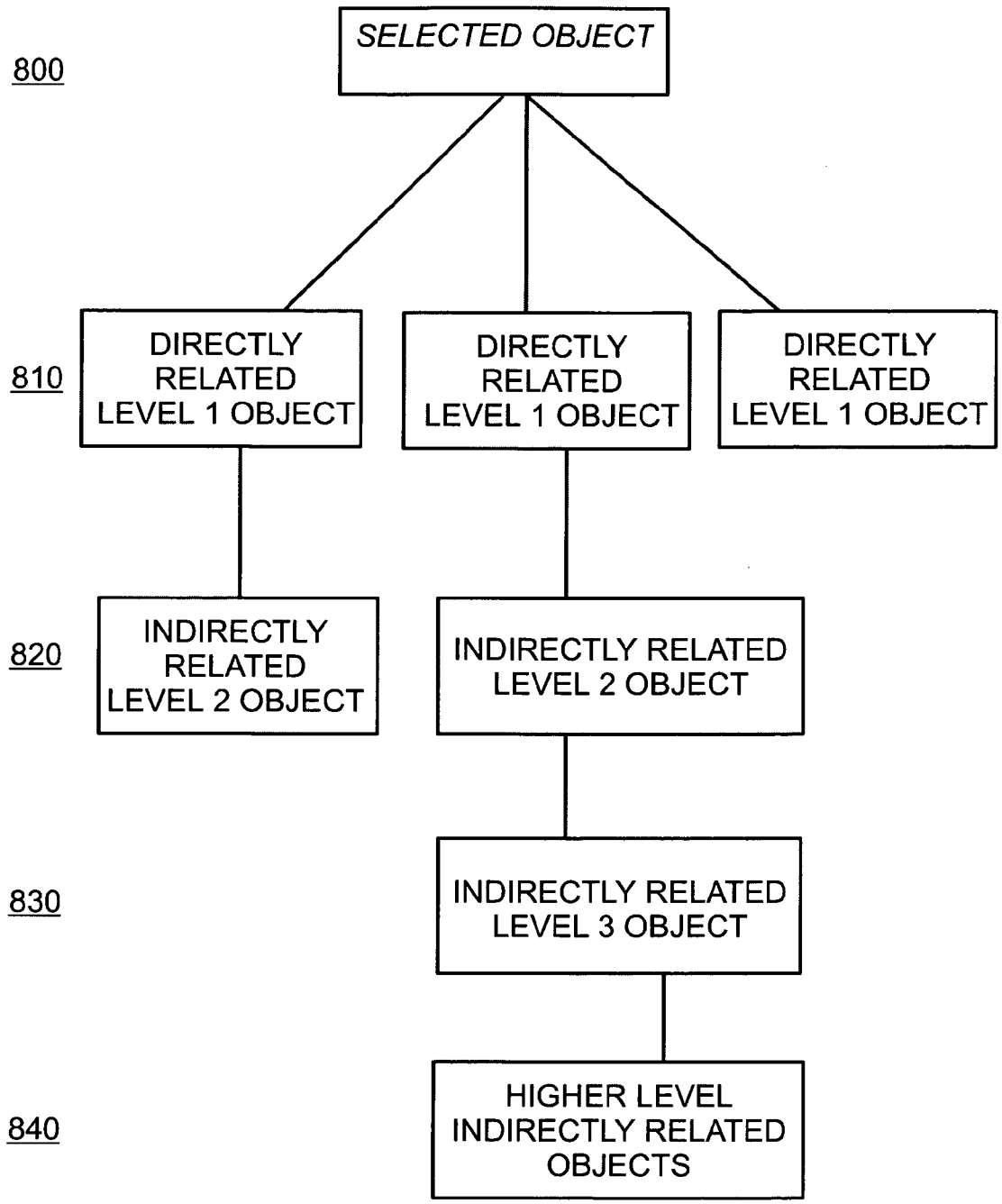
FIG. 11 is a tree diagram showing the hierarchal relationships between a selected object and directly and indirectly related objects.

Reference is now made to FIG. 11, which is a schematic tree diagram showing the hierarchal relationships existing between a selected object 800, and both directly related objects 810 and indirectly related objects 830. Objects may be assigned a number order that describes their relationship with a selected object, thus objects having a direct relationship to a selected object 800, are considered directly related objects 810, and have a level one dependency. Objects only related to the selected object via an intermediate, directly related, level-one dependency object 810, are considered indirectly related, level-two dependency objects 820. Objects only related to the selected object via two intermediate objects, that is objects directly related to level-two dependency objects 820 are considered level-three dependency objects 830, and so on.

A third type of counter may set an upper limit on the number of dependency levels that may suffer a consequential reaction as a result of an interaction with a first object. Thus a limitation can be considered that only allows objects having a relationship of a level not further removed than a specified dependency type to move with the selected object. For example, if a level one dependency is applied to the chess scene shown in FIG. 8, if the table 300 is moved, the chessboard 320 and the white pawn 332 will move in consequence of the table 300 being moved by a user, since they are directly linked to the table. The chessmen on the board 330, 340 however, will stay where they are in virtual space, and are left behind when the table is moved, since they are only indirectly linked to the table via the chessboard, and thus have a level two dependency. Again, for tables having objects with associated objects thereon, a less restricting limitation, such as a level two dependency, may be more appropriate.

EXAMPLE

A preferred embodiment of the present invention comprises a distributed, real time and interactive three-dimensional system, the core of which is a memory resident, real-time, object-oriented database called the SDB (scene database). By incorporating the new features of split objects, experts, relationships and counter control as described herein, it is possible to facilitate controlled multi-client interaction with 3D virtual reality applications, with the individual users using standard 2D input devices such as the computer mouse for interacting with the program.

The separation of the form and function of objects and scenes simplifies the way in which data from an external source may be used to dynamically control and update a scene. Furthermore, separation of form and function permits data coming from different sources to be represented by essentially the same scene.

A prototype of the preferred embodiment was developed in GInIt, wherewith the 3D virtual reality was perceived on standard 2D computer monitors, and was also perceived using special immersion equipment. A Solid Modeler was used for object rendering and for animations.

The scene database was implemented in C++ and enables a large number of users to interact with a relatively small number of objects. The SDB was further developed to allow the creation of new objects in real-time.

In addition to other features of the scene database, the prototype comprises the four features of object splitting, expert control, relationships and counter control as described herein.

There is thus provided a virtual environment comprising objects showing the feature of object splitting, where some of the functionalities of the objects are controlled by expert control, using experts associated with the environment. Relationships may exist between objects within the environment, and extent of consequential interactions resulting from these relationships, may be limited using counter control. It will be appreciated however, that these features may be provided either separately or in any combination.

It will be further appreciated by persons skilled in the art that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

It will be further appreciated that certain features of the invention, which are, for clarity, described above in the foregoing description in the context of separate embodiments, may also be provided in combination in a single embodiment. Conversely, various features of the invention, which are, for brevity, described in the context of a single embodiment, may also be provided separately or in any suitable combination or sub-combination.

The invention claimed is:

1. A server adapted to communicate with a remote client, said server comprising:
   a scene;
   a plurality of object oriented programming (OOP) encapsulated virtual objects for use in an object-oriented environment; each said virtual object integrally having
   at least a user-sensible aspect and further comprising at least a functional aspect; said user-sensible aspect being encapsulated as a user-sensible encapsulation, separately from said functional aspect, each said encapsulated virtual object being split by locating respective integrally related user-sensible and functional encapsulations of the same virtual object at said remote client and said server respectively, each said encapsulated virtual object comprising a definition of at least one relationship with another said encapsulated virtual object and said scene.

2. A server as claimed in claim 1, said object-oriented environment being supported on a computer network comprising a first computer linked to a second computer; wherein the said user-sensible aspect is supported by said first computer and the said functional aspect is supported by said second computer.

3. A server as claimed in claim 1, where said functional aspect is a behavioral aspect.

4. A server as claimed in claim 1, where said user-sensible aspect comprises at least one of a display aspect and an interaction aspect.

5. A server as claimed in claim 1, wherein said functional aspect is encapsulated in a functional encapsulation, and said functional encapsulation is exchangeable for an alternative functional encapsulation, thereby to alter the functionality of the said object.

6. A server as claimed in claim 1, wherein said at least one relationship is any one of a group comprising a coloring relationship, a positioning relationship, a shape relationship, a timing relationship, a movement relationship, a size relationship, a color relationship, a texture relationship and a reaction relationship.

7. The server of claim 1, wherein at least some of said virtual objects comprise
   a functionality for avoiding undesirable loops by preventing a consequential interaction between a first one of said virtual objects with a second one of said virtual objects when a number of interacting objects involved in said consequential interaction reaches a predefined maximum, wherein said interacting objects include said second virtual object, and any virtual object intermediating between said first virtual object and second virtual object.

8. A server as claimed in claim 7, wherein said consequential interaction is direct.

9. A server as claimed in claim 7, wherein said consequential interaction is an indirect interaction, being an interaction involving at least one mediating interaction with at least one intermediate object.

10. A server as claimed in claim 9, said relationship with at least said second virtual object being defined by an order number, said order number being equal to the number of consequentially interacting objects.

11. A server as claimed in claim 10, having a predetermined interaction limit, and an interaction stopper operable to prevent further consequential interactions occurring once a number of interactions corresponding to said interaction limit has been reached.

12. A server as claimed in claim 11, wherein said predetermined interaction limit is specific to at least one of an interaction order and an interaction type, and said interaction stopper is operable to stop interactions within said specificity.

13. A server as claimed in claim 7, wherein said consequential interaction with said at least second object comprises a change in at least one of location, movement, shape, size, status, internal parameters, color and texture of said second object.

14. A virtual reality environment comprising a scene and a plurality of object oriented programming (OOP) encapsulated virtual objects supported by a scene database, said scene database having at least a first OOP object having an interchangeable functional unit associated therewith, said first interchangeable functional unit comprising functionality for each said virtual object, said virtual reality environment configured to support a method for facilitating interaction by a plurality of users at a plurality of client terminals with each said encapsulated virtual object, each said encapsulated virtual object having display and interaction characteristics and functional characteristics, said method comprising:
  encapsulating the display and interaction characteristics in a display part of each said virtual object encapsulating functional characteristics in a functional part of each said encapsulated virtual object, each said encapsulated virtual object comprises a definition of at least one relationship with another said virtual object and said scene;
  downloading said display part of said first object to user client terminals, and
  retaining said functional part of said first object at a remote location networked with said user client terminals, thereby facilitating splitting said first virtual object between two terminals.

15. A virtual reality environment as claimed in claim 14, wherein said functionality for each said encapsulated virtual object comprises behavior.

16. A virtual reality environment as claimed in claim 14, wherein said functionality for each said encapsulated virtual object comprises rules for determining allowable interactions therewith.

17. A virtual reality environment as claimed in claim 14, wherein said functionality comprises rules for determining non-allowable interactions therewith.

18. A virtual reality environment as claimed in claim 14, wherein said functionality comprises rules for restricting allowable interactions therewith.

19. An encapsulated virtual reality environment as claimed in claim 14, wherein each said encapsulated virtual object comprises a user-sensible aspect and said user-sensible aspect is encapsulated separately from said interchangeable functional unit.

20. A virtual reality environment as claimed in claim 19, wherein said user-sensible aspect comprises at least one of data for display of at least one of said plurality of encapsulated virtual objects and interaction features.

21. A virtual reality environment as claimed in claim 14, wherein said interchangeable functional unit is interchangeable to alter the functionality of said virtual object.

22. A virtual reality environment as claimed in claim 14, wherein said first interchangeable functional unit comprises object-specific functionality for a plurality of virtual objects.

23. A virtual reality environment as claimed in claim 19, further comprising at least one second virtual object where said first virtual object comprises a relationship with at least one other virtual object.

24. A virtual reality environment as claimed in claim 23, wherein said relationship is direct.

25. A virtual reality environment as claimed in claim 23, said first virtual object having a relationship with said at least one second virtual object such that an interaction applied to said first virtual object causes a consequential interaction with said at least one second virtual object.

26. A virtual reality environment as claimed in claim 23, wherein said relationship with said at least one second object is an indirect relationship, being a relationship involving at least one mediating interaction with at least one intermediate object.

27. A virtual reality environment as claimed in claim 26, said relationship with said at least one second object being defined by an order number, said order number being equal to the number of consequentially interacting objects.

28. A virtual reality environment as claimed in claim 27, having a predetermined interaction total, and an interaction limiter operable to stop further first order consequential interactions occurring when a number of first order interactions equaling said predetermined interaction total has been reached.

29. A virtual reality environment as claimed in claim 25, having a predetermined interaction total, and an interaction limiter operable to stop further consequential interactions occurring when a number of interactions equaling said predetermined interaction total has been reached.

30. A virtual reality environment as claimed in claim 25, wherein said consequential interaction with said at least one second object comprises a change in position of said second object.

31. A virtual reality environment as claimed in claim 23, wherein said consequential interaction with said at least one second object comprises any one of a group comprising a coloring interaction, a positioning interaction, a shape interaction, a timing interaction, a movement interaction, a size interaction, a color interaction, a texture interaction, a status interaction a sale and an internal parameter changing interaction.

32. A virtual reality environment as claimed in claim 23, wherein said relationship is dynamically defined by a logical query.

33. The virtual reality environment of claim 14, further comprising a dedicated control element for controlling the functionality of said virtual objects said dedicated control element comprising:

identification functionality for determining whether a first virtual object within said virtual reality environment is a member of said set, and control functionality for processing events received from said first virtual object, said control functionality being operable to avoid undesirable loops by preventing a consequential interaction between said first one of said virtual objects and a second one of said virtual objects when the number of interacting objects involved in said consequential interaction reaches a predefined maximum, wherein said interacting objects include said second virtual object, and any virtual object intermediating between said first virtual object and second virtual object.

34. A method for facilitating interaction by a plurality of users at a plurality of client terminals with at least an object oriented programming (OOP) encapsulated first object, said first object having display and interaction characteristics and functional characteristics, said characteristics being integrally related within said encapsulated first object, in a networked virtual reality environment, said method comprising:

encapsulating the display characteristics in a display and interaction part of said first object, encapsulating the functional characteristics in a functional part of said first object, downloading said display and interaction part of said first object to user client terminals, and retaining said functional part of said first object at a remote location networked with said user client terminals, thereby facilitating splitting said first virtual object between two terminals, said at least an encapsulated first object comprising a definition of at least one relationship with a second virtual object and said scene.

35. A method for controlling the functionality of a set of object oriented programming (OOP) virtual objects within a virtual reality environment having a scene, comprising:

incorporating allowable functionality for said set of virtual objects within a dedicated control element associated with said virtual reality environment, incorporating identification functionality within said dedicated control element to enable said dedicated control element to distinguish between virtual objects within said set and virtual objects not within said set, and thereby allowing said dedicated control element to control virtual objects within said set, said control element comprising a method for facilitating interaction by a plurality of users at a plurality of client terminals with at least a first encapsulated virtual object, said virtual object comprising at least a user-sensible aspect and further comprising at least a functional aspect, said user-sensible aspect and said functional aspect being integrally related within said first encapsulated virtual object; said user-sensible aspect being encapsulated as a user-sensible encapsulation, separately from said functional aspect, thereby facilitating splitting said first virtual object between two terminals, each said virtual object comprises a definition of at least one relationship with at least one of said virtual object and said scene.

36. A method for facilitating interaction by a plurality of users at a plurality of client terminals with at least a first object oriented programming (OOP) encapsulated virtual object, said first object having display characteristics and functional characteristics integrally related therein, in a networked virtual reality environment having a scene and a plurality of object oriented programming (OOP) virtual objects; said method comprising:

encapsulating the display characteristics in a display and interaction part of said first object;

encapsulating the respectively integrally related functional characteristics in a functional part of said first object;

downloading said display and interaction part of said first object to user client terminals, each said virtual object comprising a definition of at least one relationship with another said virtual object and said scene, and retaining said functional part of said first object at a remote location networked with said user client terminals, thereby facilitating splitting said first virtual object between two terminals;

said interactions comprising trading using said objects.

37. The server of claim 1, wherein said plurality of OOP encapsulated virtual objects are added and removed from said object-oriented environment in real time.

* * * * *